United States Patent [19]
Scalzo et al.

[11] 3,829,233
[45] Aug. 13, 1974

[54] TURBINE DIAPHRAGM SEAL STRUCTURE

[75] Inventors: Augustine J. Scalzo, Philadelphia; Kent G. Hultgren, Secane, both of Pa.

[73] Assignee: Westinghouse Electric Corporation, Pittsburgh, Pa.

[22] Filed: June 27, 1973

[21] Appl. No.: 373,849

[52] U.S. Cl.................. 415/110, 415/136, 415/175, 277/53
[51] Int. Cl............................ F01d 11/00, F02 11/00
[58] Field of Search .......... 415/116, 110, 113, 136, 415/172, 175; 277/53

[56] References Cited
UNITED STATES PATENTS

| | | | |
|---|---|---|---|
| 2,996,279 | 8/1961 | Lorett et al.......................... | 415/110 |
| 3,408,048 | 10/1968 | Scalzo................................ | 415/113 |
| 3,411,794 | 11/1968 | Allen ................................. | 415/172 A |
| 3,529,904 | 9/1970 | Scalzo et al........................ | 415/110 |
| 3,594,010 | 7/1971 | Warth................................. | 277/53 |

*Primary Examiner*—Henry F. Raduazo
*Attorney, Agent, or Firm*—D. N. Halgren

[57] ABSTRACT

A seal arrangement for a bladed diaphragm of an axial flow fluid machine, such as a gas turbine, that reduces leakage past the diaphragm blades. A seal housing ring is supported from diaphragm segments by radially movable keys, thus permitting relative motion between the diaphragm segments and the seal assembly. An upstream circumferentially disposed wall of the housing is held compressed in frictional contact with a radially inward flange of the diaphragm. The housing is supplied with a coolant fluid which is allowed to escape around the seals. The escaping coolant fluid prevents hot working fluid from entering this housing. The upstream wall of the housing is held in a compressed state by a spring. This spring permits relative sliding movement between the diaphragm and the seal housing, while controlling leakage of the motive fluid into the cooling fluid.

5 Claims, 5 Drawing Figures

3,829,233

TURBINE DIAPHRAGM SEAL STRUCTURE

BACKGROUND OF THE INVENTION

1. Field of the Invention

This invention relates, generally, to elastic fluid machines, such as turbines, and, more particularly to seal structures for bladed diaphragms of gas turbine machines.

2. Description of the Prior Art

In some prior structures, sealing the portion of the turbine inwardly of the stator vanes consisted of a radially inwardly directed flange mounted on an inner shroud. Other structures consisted of rotating heat shields bolted to adjacent rotors, or a labyrinth seal between the stator inner shroud and the shield. Large radial clearances between portions of the structure and rotating parts of the turbine allowed leakage of fluids between these portions of the turbine. Any cooling fluid supplied through the stator vanes in these arrangements is often contaminated by being mixed with the hot working fluid. The efficiency of the turbine having seals of this type is not good because of the lower effectiveness of the cooling fluid, and because of the lower temperature of the hot motive fluid.

A diaphragm seal structure is described in U.S. Pat. No. 3,408,048 by A. J. Scalzo. Another diaphragm seal structure is described in U.S. Pat. No. 3,529,904 by A. J. Scalzo and J. H. Borden, both patents being assigned to the same assignee as this invention. The former patent describes a seal housing structure slidably carried in an inner shroud. The latter patent describes a seal housing structure supported by radially movable keys. Each of the aforesaid patents discloses efficient seal arrangements, and each limits the radial clearances between portions of the turbine. However, leakage of hot gases from the hot motive fluid flow path into the cooling fluid chamber could contaminate the cooling fluid.

An object of this invention is to provide an improvement in the sealing arrangement disclosed in the aforesaid patents.

SUMMARY OF THE INVENTION

In accordance with one embodiment of the invention, a bladed diaphragm structure, forming a part of the stage in an axial flow gas turbine or the like, is divided into arcuate segments and mounted in a blade ring in a turbine casing. A seal housing ring is supported from the diaphragm segments by radially movable key blocks, thus permitting relative radial motion between the diaphragm segments and the seal assembly. The upstream wall of the housing is comprised of arcuate seal plate segments. The seal plate segments are supported inwardly by a circumferentially directed groove disposed on a seal housing ring. The radially outer edge of the seal plate segments overlap with, and are held in frictional sliding engagement with a radially inwardly directed flange from the inner shroud. A spring holds the seal plate in the frictional engagement with the flange. The spring is disposed within the housing. The housing is also a plenum chamber for receiving cooling fluid. The seal plate segments permit additional relative motion between the diaphragm and the seal assembly, which helps to minimize the radial clearances, and also serves to reduce the amount of hot motive fluid mixing with and contaminating the cooling fluid within the housing.

BRIEF DESCRIPTION OF THE DRAWINGS

For a better understanding of the nature and objects of the invention, reference may be had to the following detailed description, taken in conjunction with the accompanying drawings, in which.

DESCRIPTION OF THE PREFERRED EMBODIMENT

Figure 1:
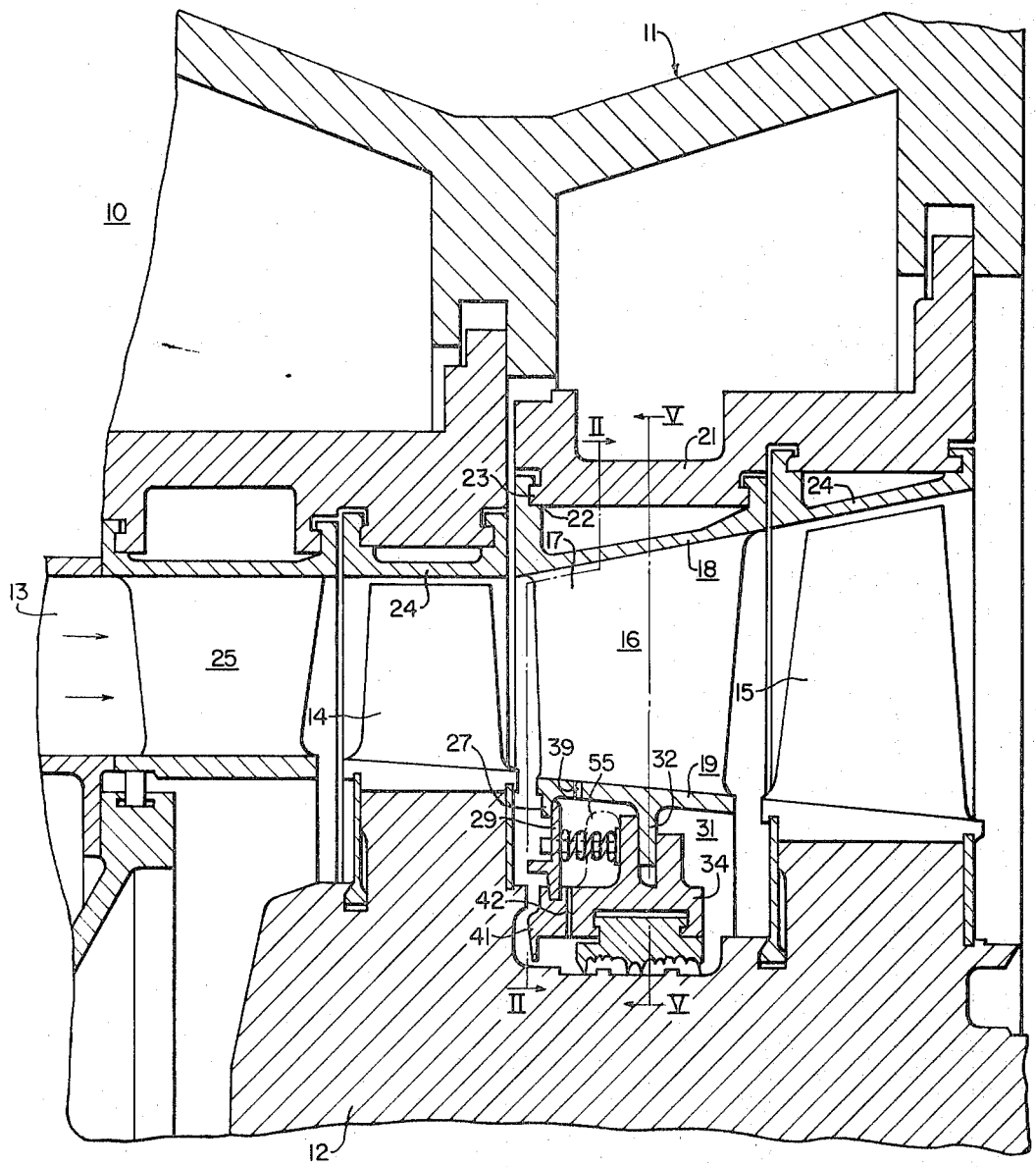
FIG. 1 is an axial sectional view of a portion of a gas turbine embodying the principal features of the invention.

Referring to the drawings, particularly to FIG. 1, a portion of a turbine 10 shown therein comprises a casing 11, generally circular in cross-section, and a rotor 12 rotatably mounted in the casing 11 and supported in suitable bearings, not shown, for rotation about a central axis. The casing 11 and the rotor 12 jointly define an annular passageway 13 through which hot motive fluid flows in an axial direction as indicated by the arrows of FIG. 1. The motive fluid may be the product of the fuel combustion from combustion chambers, not shown, such as those utilized in a gas turbine.

The rotor 12 is provided with at least two axially spaced rows of rotor blades 14 and 15 extending radially outwardly across the passageway 13. Additional rows of blades may be provided if desired, thereby increasing the number of motive fluid expansion passageways in the turbine. An annular diaphragm structure 16 is disposed within the casing 11 in encompassing concentric relation with the rotor 12. The diaphragm 16 has an annular array of stationary blades 17 extending across the passageway 13 between the two rows of rotor blades 14 and 15. The stationary blades of the diaphragm direct the flow of motive fluid into the rotor blades to motivate the rotor in a manner well known in the art.

Figure 2:
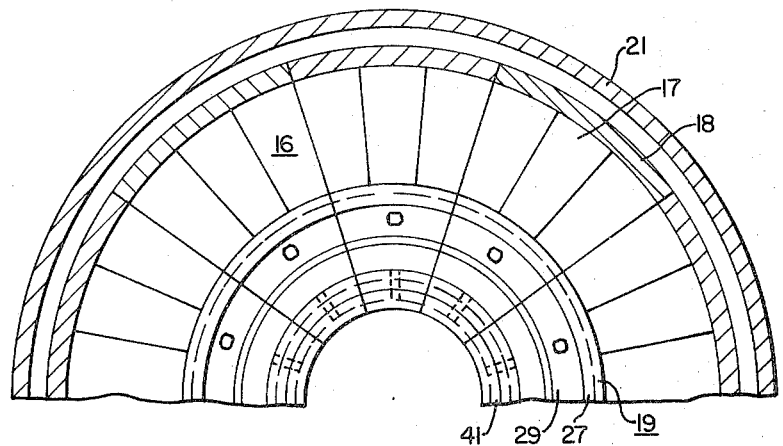
FIG. 2 is a transverse sectional view taken along the line II—II of FIG. 1.

As shown more clearly in FIG. 2, the diaphragm structure 16 is divided into a plurality of segments disposed in a closely spaced relation with each other in an annular array. In the present instance, each half of the diaphragm structure 16 is divided into five equal segments, hence, each segment extends 36°. Each segment has an outer arcuate segment 18 and an inner arcuate shroud segment 19 between which the stationary blades 17 are secured.

As shown more clearly in FIG. 1, the diaphragm structure 16 is supported by a blade ring 21 mounted inside the casing 11 in any suitable manner. The outer shroud segments 18 are generally channel-shaped in cross-section with grooves 22 provided in opposite sides of the channel for receiving tongues or projections 23 on the blade ring 21, thereby slidably retaining the outer shroud segments to the blade ring 21.

As also shown in FIG. 1, ring segments 24, which are similar in cross-section to the shroud segments 18, are attached to the blade ring 21 in a manner similar to the manner in which the shroud segments 18 are attached to the blade ring 21. The ring segments 24 encircle the outer rotor blades 14 and 15. An additional diaphragm structure 25, generally similar to the diaphragm structure 16, is also provided. As is well known in the art, the diaphragm 25 and the rotor blades 14, form a first expansion stage, while the diaphragm 16 and the rotor blades 15 form a second expansion stage.

Figure 3:
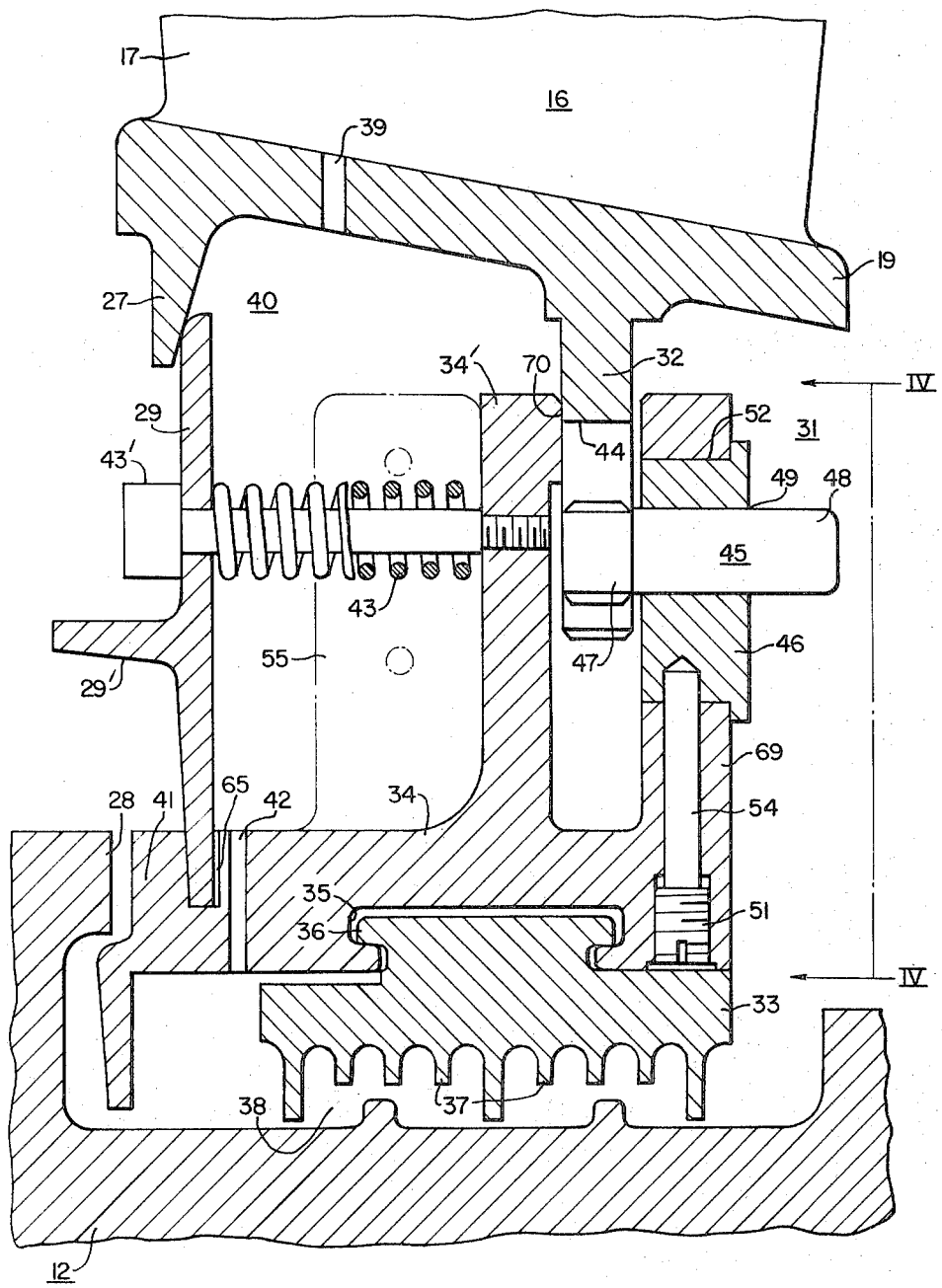
FIG. 3 is an enlarged detail view, in section, of the sealing arrangement.

As shown in FIGS. 1 and 3, the inner shroud ring 19, is provided with an annular radially inwardly extending flange 27. The flange 27 cooperates with an arcuate seal plate segment 29 to provide an initial restriction to leakage of motive fluid past the diaphragm structure 16. A restriction to leakage of motive fluid is also provided by a diaphragm seal assembly 31 supported by an arcuately segmented radially inwardly extending rib 32 on the inner shroud 19. The seal assembly 31 cooperates with the rotor 12 to prevent leakage along the rotor, and the arcuate seal plate 29 overlaps and slidably contacts the radially inwardly extending flange 27 to allow relative movement between the two members 19 and 31, because of expansion and contraction of those members due to thermal variations.

As shown more clearly in FIG. 3, the diaphragm seal assembly comprises an annular array of seal members or shoes 33 formed as arcuate segments and carried by an annular seal housing ring 34 in closely spaced sealing relation with the rotor 12. The seal housing ring 34 is provided with an annular keyway 35 and the seal segments 33 are provided with annular keying portions 36 slidably retained in the keyways 35. The seal surface of each seal segment 33 may be provided with annular ribs 37, tooth-shaped in cross-section, forming a labyrinthian restricted passage 38 with the seal surface of the rotor 12, thereby minimizing the flow of fluid along the rotor.

As also shown in FIG. 3, the volume between the inner shroud segments 19 and the seal housing ring 34 comprises an annular receiving chamber 40 for cooling fluid. A plurality of orifices 39 are disposed in the inner shroud ring 19. Cooling fluid passes through the stationary blades 17 through the orifices 39, then into the annular cooling fluid chamber 40, exiting out through a plurality of orifices 42 in the seal housing ring 34. A portion of the fluid escapes downstream past the labyrinthian passage 38, and a portion of the fluid escapes upstream past a radially inwardly extending flange 41 disposed on the upstream edge of the seal housing ring 34.

The segmented seal plate 29 is held on its inward edge by a circumferential slot 65 disposed upstream of the orifices 42 on the seal housing ring 34. A spring member 43 is disposed between a radially extending rib member 34' extending radially off the seal housing ring 34, and the segmented seal plate 29. The spring member 43 maintains the segmented seal plate 29 in tight sliding contact with the radially inwardly directed flange 27. The spring member 43 is retained from dislocation by a spring retaining bolt 43'. The head of the bolt 43' is disposed through the seal plate 29. The bolt 43' extends axially through the spring member 43, and is threaded into the radially extending rib member 34'.

Figure 4:
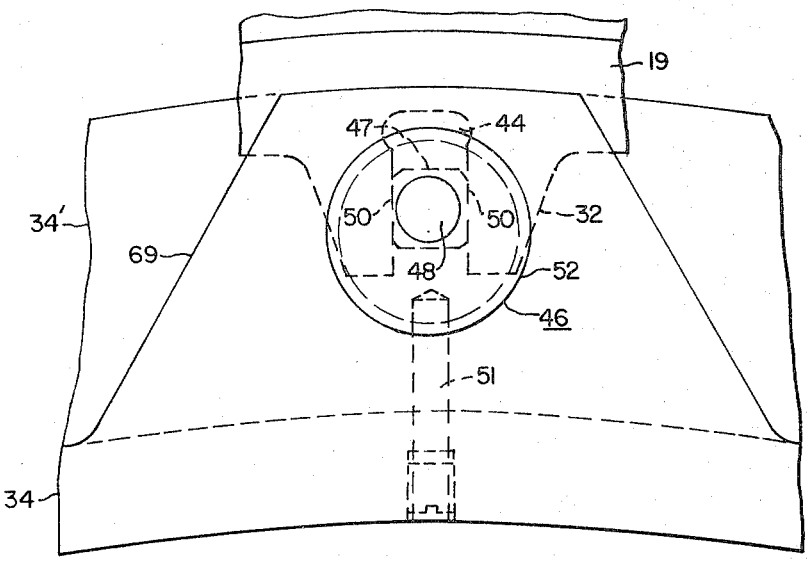
FIG. 4 is an enlarged detail view, in elevation, of the seal housing ring support, taken along the lines IV—IV of FIG. 3.

The segmented seal plate 29, as shown in FIG. 3, allows a relative movement between the inner shroud 19 and the seal housing member 34. The segmented seal plate 29 has a circumferentially extending flange 29' on the upstream side of the segmented seal plate 29, which acts as a baffle between the hot motive fluid flow path and an annular shoulder portion 28 of the rotor 12. The seal housing ring 34 has on its downstream edge a radially outwardly extending rib 69 overlapping a portion of the radially inwardly extending rib 32 on the inner shroud 19. The other annular radially outwardly extending rib 34' is spaced axially upstream from the rib 69, has a surface 70 which engages the upstream side of the rib 32, which is the side opposite the side of the rib 32 adjacent to the rib 69. As shown in FIG. 4, the rib 34' is annularly continuous, but the rib 69 may be formed as a series of circumferentially spaced projections of a generally trapezoidal shape. This arrangement is similar to that described in the aforesaid patents.

Figure 5:
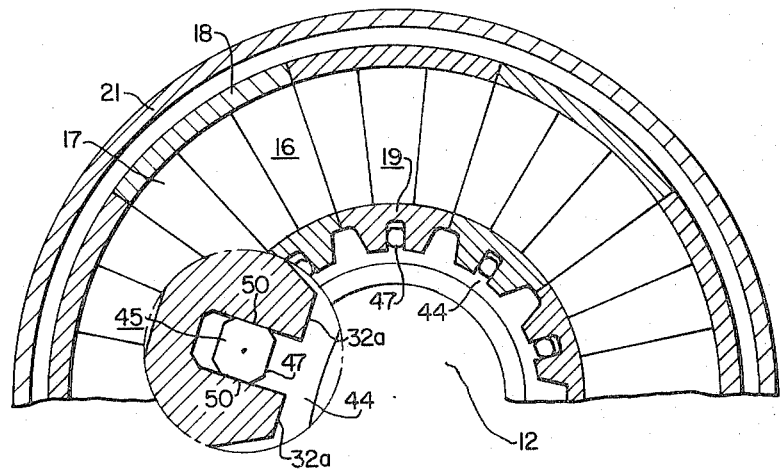
FIG. 5 is a transverse sectional view taken along the lines V—V of FIG. 1.

As shown more clearly in FIGS. 4 and 5, radial slots 44 in the circumferentially spaced projections 32A on the rib 32 guide the movement of radial keys and pins 45. The radial keys and pins 45 are supported by eccentric bushings 46 retained in the rib 69 of the seal housing 34, as shown in FIGS. 3 and 4. Each integral guide key and pin 45 has a head portion 47, which is generally square with oppositely disposed flat surfaces 50 slidably disposed and closely fitted in the slot 44, and a cylindrical portion 48 mounted in an eccentrically disposed opening 49 in the bushing 46. A threaded locking pin 51 is utilized to lock each eccentric bushing 46 in position in the cylindrical opening 52 in the rib 69. During operation of the turbine, the stage pressure drop forces the seal housing rib 34' against the diaphragm rib 32. The segmented seal plate 29 is forced by the spring member 43 against the radially inwardly directed flange 27. This maintains the pressure of the cooling fluid within the annular plenum chamber 40 and allows a controlled leakage of cooling fluid out between the seal members 33 and 34 and the rotor 12.

As explained in the aforesaid patents, the seal housing ring 34 may be divided into two halves joined together at a horizontal joint 55, see FIGS. 1 and 3. The two halves may be joined together by bolts prior to the assembling of the blade ring 21 and the casing 11. When the casing 11 and the blade ring 21 have horizontal joints, the radial guide keys 45 may be provided in the lower half only of the housing ring, thus providing for easy access to the rotor 12.

The assembly of the seal structure is accomplished without requiring any hand-fitting of mating surfaces. The procedure is as follows: First, the seal housing ring 34 is assembled with the seal plate 29, spring member 43 and retaining bolt 43'. This assembly is then positioned concentrically with the axis of the turbine. The heads 47 of the integral guide keys and pins 45 are inserted into the radial guide slots 44 in the diaphragm projections 32A. The eccentrically disposed openings 49 in the bushings 46 are aligned with the cylindrical ends 48 of the integral guide keys and pins 45 and the bushings are inserted into the cylindrical openings 52 in the rib 69 of the seal housing 34. Lock pin holes 53 are drilled into the eccentric bushings 46 using previously drilled radial holes 54 in the seal housing 34 as guides. The lock pins 51 are then inserted and staked to prevent loosening. The seal segments 33 may then be installed in the seal housing 34.

During transient temperature cycles the diaphragm segments 18 and 19 in the turbine casing 11 and the seal housing ring 34 expand radially inwardly or outwardly at different rates. To accommodate this relative displacement, the heads 47 of the integral guide keys and pins 45 slide in the radial slots 44, and the segment seal plates 29 may slide in relation to the radially directed flange 27. The only resistance to this motion is the frictional resistance resulting from the weight of the diaphragm seal assembly and the friction between the seal plates 29 and the flange 27. The cylindrical ends 48 of the guide keys 45 rotate slightly in the eccentric bushings 46 to accept the weight component perpendicular to the key flats. This relative displacement is easily accommodated by the sliding engagement of the segmented seal plate 29 over the radially inwardly extending flange 27. This arrangement permits the diaphragm segments of a particular row to be at different temperatures without displacing the seal ring.

From the foregoing description, it is apparent that the invention provides a seal arrangement which is an improvement over the structures disclosed in the aforesaid patents, which reduces leakage of motive fluid past the seal assembly, and helps reduce the contamination of the cooling fluid in the housing by the hot motive fluid. Smaller radial seal clearances can be utilized, since the seal assembly is independent of the transient thermal response of the diaphragm segments. Furthermore, the components of the present seal structure can be assembled without requiring hand-fitting of mating surfaces as was required during the assembly of the first recited prior art seal structure.

Since numerous changes may be made in the above-described construction, and different embodiments of the invention may be made without departing from the spirit and scope thereof, it is intended that all matter contained in the foregoing description, or shown in the accompanying drawings, shall be interpreted as illustrative and not in a limiting sense.

We claim as our invention:

1. In an axial flow gas turbine machine, in combination, a casing of generally circular cross-section, a rotor disposed within said casing and defining therewith an annular motive fluid passage, an annular row of blades carried by the rotor and extending radially outwardly across said passage, a diaphragm structure disposed within the casing in encompassing concentric relation with the rotor and having an annular array of stationary blades extending across said passage adjacent said rotor blades, said stationary blades being cooled by passage of cooling fluid therethrough, said diaphragm including an arcuately segmented inner shroud ring carried by the stationary blades and having an arcuately segmented radially inwardly extending rib and a radially inwardly directed flange, an annular seal housing structure having a radially outwardly extending rib portion overlapping a portion of the rib on the inner shroud ring, said annular housing having a cooling fluid receiving and expending means, an arcuate segmented seal member disposed off the upstream end of said housing in sealing relation with said rotor, an annular array of arcuately segmented seal segments carried by the seal housing in sealing relation with the rotor, guide means eccentrically mounted in one side of said rib portions to permit centering of the seal housing and cooperating with the other side of said overlapping rib portions to permit relative radial movement between the diaphragm segments and the seal housing structure and restraining relative movement of the seal housing structure, an upstream housing wall comprising a plurality of arcuate segmented radially directed seal plates overlapping and in frictional engagement against said radially inwardly directed flange, and a biasing means maintaining the frictional engagement between said seal plates and said flange.

2. The combination as recited in claim 1, wherein said annular housing cooling fluid receiving means comprises a plurality of orifices in said inner shroud, said annular housing cooling fluid expending means comprises a plurality of generally radially inwardly directed orifices downstream of and adjacent the inner edges of said arcuate seal plates in said annular housing, the cooling fluid escaping in a generally radially inwardly direction from said housing, the escaping cooling fluid flowing between the sealing segments and the rotor preventing the motive fluid from entering the annular housing and contaminating the cooling fluid therein.

3. The combination as recited in claim 1, wherein the radially outward edge of said arcuately segmented seal plates are held by said biasing means in frictional sliding engagement with said inwardly extending flange disposed on said inner shroud, the inner edge of said arcuate seal plates being disposed in the circumferentially disposed groove in said annular housing.

4. The combination as recited in claim 1, wherein said biasing means are springs, at least one of said springs being disposed between said outwardly extending furthermost upstream rib on said annular housing disposed across said annular housing to each of said segmented arcuate seal plates.

5. The combination as recited in claim 1, wherein said arcuately segmented seal plates have on their upstream side a circumferentially extending flange member providing a baffle between the hot motive fluid flow path and a shoulder portion of the rotor.

* * * * *